(12) United States Patent
Doceux

(10) Patent No.: US 11,538,337 B2
(45) Date of Patent: Dec. 27, 2022

(54) SYSTEM AND METHOD FOR MALFUNCTION NOTIFICATION FOR A VEHICLE

(71) Applicant: Continental Automotive GmbH, Hannover (DE)

(72) Inventor: Erwan Doceux, Toulouse (FR)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 17/612,369

(22) PCT Filed: Jun. 9, 2020

(86) PCT No.: PCT/EP2020/065928
§ 371 (c)(1),
(2) Date: Nov. 18, 2021

(87) PCT Pub. No.: WO2020/249545
PCT Pub. Date: Dec. 17, 2020

(65) Prior Publication Data
US 2022/0230541 A1    Jul. 21, 2022

(30) Foreign Application Priority Data
Jun. 12, 2019  (FR) .................... 1906246

(51) Int. Cl.
*G08G 1/0967* (2006.01)
*H04W 4/44* (2018.01)

(52) U.S. Cl.
CPC . *G08G 1/096791* (2013.01); *G08G 1/096741* (2013.01); *H04W 4/44* (2018.02)

(58) Field of Classification Search
CPC ...... G08G 1/096791; G08G 1/096741; H04W 4/44
See application file for complete search history.

(56) References Cited

U.S. PATENT DOCUMENTS 9,704,396 B1 *  7/2017  Owens ................ G08G 1/0965
9,704,398 B2    7/2017  Owens et al.
2019/0311404 A1 * 10/2019  Wasserman ............ E01F 9/00

OTHER PUBLICATIONS

"Method and System for Providing Communications Between Anonymous Vehicle Drivers", IP.com Journal, IP.com Inc., 2017, 3 pages.
(Continued)

*Primary Examiner* — James J Yang
(74) *Attorney, Agent, or Firm* — RatnerPrestia

(57) ABSTRACT

A notification method configured so as to signal to a user a malfunction liable to affect his vehicle during a driving phase. The notification method includes a monitoring step configured so as to generate route datasets relating to a driving route of a vehicle of each user; a malfunction signaling step configured so as to generate signaling datasets including information about the vehicle in question relating to a malfunction with the vehicle in question as observed by a user-observer; an analysis step configured so as to identify which vehicle is the vehicle in question, on the basis of the route datasets and the signaling datasets; and a notification step configured so as to generate a notification message intended for the user of the vehicle in question.

9 Claims, 2 Drawing Sheets

(56) References Cited

OTHER PUBLICATIONS

International Search Report and Written Opinion for International Application No. PCT/EP2020/065928, dated Jul. 23, 2020, 7 pages.
International Search Report and Written Opinion for International Application No. PCT/EP2020/065928, dated Jul. 23, 2020, 11 pages (French).
English translation of Written Opinion for International Application No. PCT/EP2020/065928, dated Jul. 23, 2020, 4 pages.

* cited by examiner

SYSTEM AND METHOD FOR MALFUNCTION NOTIFICATION FOR A VEHICLE

CROSS REFERENCE TO RELATED APPLICATIONS

This application is the U.S. National Phase Application of PCT International Application No. PCT/EP2020/065928, filed Jun. 9, 2020, which claims priority to French Patent Application No. 1906246, filed Jun. 12, 2019, the contents of such applications being incorporated by reference herein.

FIELD OF THE INVENTION

The present invention relates in general to a malfunction notification system and method for a vehicle.

The invention pertains more particularly to a notification method and system for signaling to a driver a malfunction liable to affect his vehicle, without using a dedicated sensor.

BACKGROUND OF THE INVENTION

Modern vehicles, such as electric vehicles ("EV"), hybrid electric vehicles ("HEV") and combustion vehicles, have a malfunction detection system configured so as to detect and signal to the driver of the vehicle when a malfunction with an item of vehicle equipment occurs, such as a deflated tire or an open fuel flap, for example. The detection system comprises sensors coupled to the vehicle equipment in question.

However, if one of the associated sensors is faulty, the driver is no longer able to be warned of the presence of a malfunction that is supposed to be detected by the sensor and the associated mechanism. This may put the driver in a hazardous situation. With regard to some malfunctions, such as in general for luminous signaling devices, there is simply no malfunction detection device in modern vehicles.

There is therefore a need for a solution that makes it possible to signal to a driver a malfunction liable to affect his vehicle while driving, in particular independently of the malfunction detection performed by an existing detection system integrated into the vehicle in question.

SUMMARY OF THE INVENTION

To achieve this result, an aspect of the present invention relates to a notification method configured so as to signal to a user a malfunction liable to affect his vehicle during a driving phase; said notification method comprising a monitoring step configured so as to generate route datasets relating to a driving route of a vehicle of each user; a malfunction signaling step configured so as to generate signaling datasets comprising information about the vehicle in question relating to a malfunction with said vehicle in question as observed by a user-observer; an analysis step configured so as to identify which vehicle is the vehicle in question, on the basis of the route datasets and the signaling datasets; and a notification step configured so as to generate a notification message intended for the user of the vehicle in question.

An aspect of the invention thus makes it possible to signal to the user of the vehicle in question a malfunction liable to affect his vehicle while driving, independently of the malfunction detection performed by an existing detection system integrated into the vehicle in question.

Advantageously, the set of signaling datasets is used to estimate a signaling route taken by the user-observer.

Advantageously, the analysis step consists in comparing a plurality of driving routes respectively taken by a plurality of users with a plurality of signaling routes relating to a plurality of user-observers, so as to determine whether, among the driving routes, there is a selected driving route that corresponds to one or more signaling routes each lasting for a time period contained within the time period of the selected driving route; the vehicle of the user relating to the selected driving route being identified as the vehicle in question.

Preferably, if a minimum percentage of a driving route corresponds to one or more signaling routes, said driving route is considered to be the selected driving route.

Preferably, the notification message is generated on the basis of the following data: the route datasets relating to the selected driving route, and the signaling datasets corresponding to the signaling routes corresponding to the selected driving route.

Advantageously, the route datasets each comprise the position of the vehicle of the user as observed at a first time, and the timestamp of said first time; the signaling datasets each comprising the position of the vehicle of the user-observer as observed at a second time, and the timestamp of said second time.

Advantageously, at least one of the signaling datasets comprises the nature of the malfunction and/or an identifier of the user-observer, the notification message comprising data used to indicate said nature of the malfunction to the vehicle in question.

Preferably, in the malfunction signaling step, the user-observer triggers the generation of the signaling dataset by pressing a predefined region of an HMI (denoted "Human-Machine Interface") interface dedicated to the user-observer.

An aspect of the invention also relates to a notification system configured so as to signal to a user a malfunction liable to affect his vehicle during a driving phase, said notification system comprising means configured so as to implement the navigation method as above; said means comprising a first HMI interface dedicated to the user relating to the vehicle that is identified as the vehicle in question, the first HMI interface being configured so as to communicate, vocally, textually or visually, a notification message to said user relating to the vehicle in question.

Preferably, said notification system furthermore comprises a second HMI interface dedicated to the user-observer, who triggers the generation of a signaling dataset by pressing a predefined region of the second HMI interface.

DESCRIPTION OF THE DRAWINGS

Other features and advantages of aspects of the invention will become more clearly apparent on reading the following description. This description is purely illustrative and must be read with reference to the attached drawings, in which.

It will be noted that the figures illustrate aspects of the invention in detail with regard to implementation thereof, said figures of course being able, where appropriate, to serve to better define the invention.

DETAILED DESCRIPTION OF THE PREFERRED EMBODIMENTS

Figure 1:
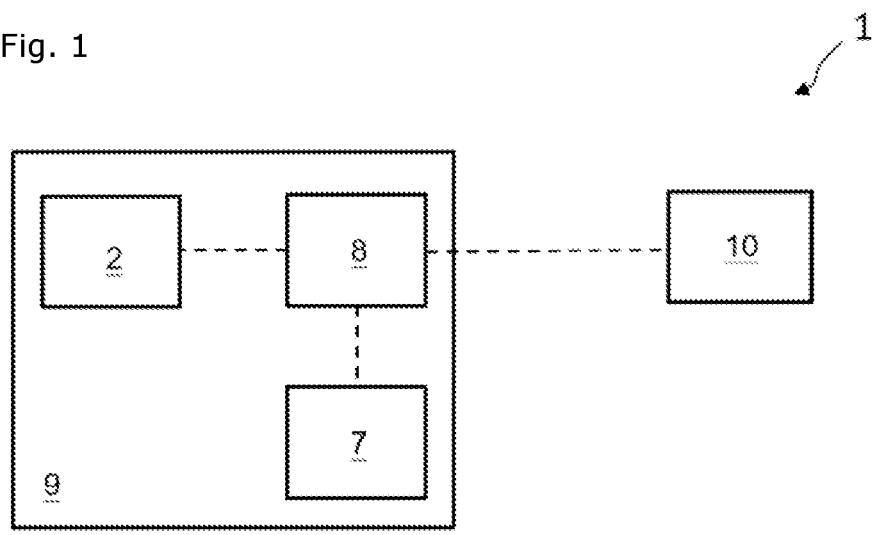
FIG. 1 illustrates a notification system according to one embodiment of the invention.
Figure 2:
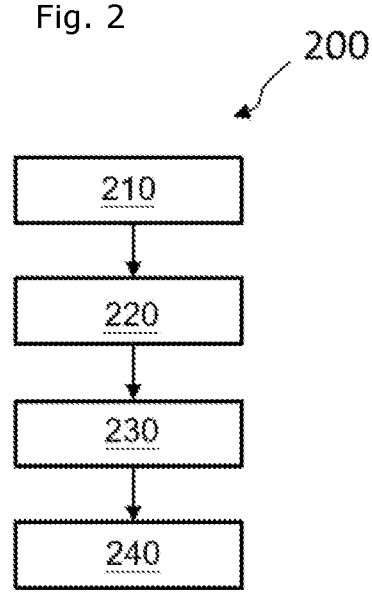
FIG. 2 illustrates steps of a notification method performed by the notification system according to one embodiment of the invention.

FIG. 1 illustrates a notification system 1 according to one embodiment of the invention. The notification system 1 is configured so as to perform a notification method 200 so as to signal to one of the users of the notification system 1 a malfunction liable to affect his vehicle during a driving phase of said vehicle, in particular independently of the malfunction detection performed by an existing detection system integrated into the vehicle in question. FIG. 2 illustrates steps 210 to 240 of the notification method 200 according to one embodiment of the invention.

The users of the notification system 1 are for example drivers of their vehicle 9. For each of the users of the notification system 1, the notification system 1 comprises an HMI (for "Human-Machine Interface") interface 2, a computing module 10 and a data storage module 7.

The HMI interface 2 and the data storage module 7 of the notification system 1 are preferably existing items of equipment in the vehicle 9. The HMI interface 2 and the data storage module 7 may be formed for example by an HMI interface of an automotive multimedia system and by a data storage means of the vehicle 9. As an alternative, the HMI interface 2 and the data storage module 7 may respectively be an HMI module and a data storage means that are respectively embedded in a machine such as a multifunction mobile telephone ("Smartphone") or a connected bracelet ("Smartwatch") worn by at least one of the users. As an alternative, the data storage module 7 is a data storage means remote from the vehicle 9 and accessible to the vehicle 9 and the computing module 10. In one of the steps of the notification method 200, the data storage module 7 is configured so as to store at least some data generated and/or received by at least one of the following modules: the HMI interface 2 and the computing module 10.

The computing module 10 may be an electronic control unit, but it is preferably a computing server remote from the vehicle 9. Advantageously, the computing module 10 is a remote cloud computing server that is able to utilize the computing and/or storage power of remote computing servers via a communications network (for example the Internet) and/or a telecommunications network. Even more advantageously, the cloud computing server has the ability to compute big data.

An aspect of the invention is however not limited to the means used to form the HMI interface 2, the data storage module 7 or the computing module 10.

In one preferred embodiment, the notification system 1 furthermore comprises a transmission module 8 configured so as to perform data transmissions between at least two of the following means of the notification system 1: the HMI interface 2, the data storage module 7 and the computing module 10. In one embodiment in which the data storage module 7 is not coupled electrically to the computing module 10, data transmissions between the computing module 10 and the data storage module 7 may be performed by the transmission module 8.

Preferably, the transmission module 8 is an existing item of equipment in the vehicle 9, and is intended to perform at least one data transmission, preferably in real time, in a preselected wireless communication mode, for example a Wi-Fi network preferably in accordance with the Wi-Fi standard of the IEEE 802.11 group (ISO/IEC 8802-11), or a cellular network preferably in accordance with 2G, 3G, 4G or 5G telecommunications standards. In other words, the transmission module 8 comprises at least one Wi-Fi connection means or at least one 2G/3G/4G/5G telecommunication means. An aspect of the invention is however not limited to the wireless connection means outlined above. A transmission module using another wireless transmission technology may be used without otherwise departing from the scope of the present invention.

A monitoring step 210 of the notification method 200 consists in generating, for each of the users of the notification system 1, a plurality of route datasets relating to a driving route of a vehicle 9 of the user. This monitoring step 210 is performed by the computing module 10 in cooperation with the vehicle 9 of the user. Each route dataset comprises the position, denoted Px, of the vehicle 9 of the user as observed at a time, denoted Tx, the timestamp of said time Tx, and preferably an identifier of the user.

In one preferred embodiment, the set of route datasets relating to the same user, generated at different times, is used to estimate the driving route taken by the user during a time period defined by the timestamps contained in the route datasets. The route datasets that are obtained are preferably stored in the data storage module 7.

The timestamp of said time Tx is recorded, preferably in the form of date, hour, minute and second. The position Px of the vehicle 9 of the user is preferably expressed by GNSS (from "Global Navigation Satellite System") coordinates comprising three-dimensional geographic coordinates (longitude, latitude, ellipsoidal elevation). In one embodiment, an item of GNSS equipment of the vehicle 9 locates the vehicle 9 in order to generate the GNSS coordinates of the vehicle 9 in real time.

A malfunction signaling step 220 of the notification method 200 is performed by one of the user-observers, using the HMI interface 2, so as to provide the notification system 1 with at least one signaling dataset used to describe information about a vehicle in question exhibiting a malfunction observed by the user-observer.

When the user-observer observes the malfunction, the vehicle in question and the vehicle of the user-observer are two different vehicles on the same road. The signaling dataset comprises the timestamp of a time, denoted Tp, and the position, denoted Po, of the vehicle of the user-observer when the user-observer observes said malfunction. Preferably, the signaling dataset furthermore comprises an identifier of the user-observer and/or the nature of the malfunction.

Advantageously, the HMI interface 2 dedicated to the user-observer is configured so as to allow the user-observer to trigger the generation of the signaling dataset by pressing a predefined region of the HMI interface 2.

In one preferred embodiment, the set of route datasets provided by a user-observer, generated at different times, is used to estimate a signaling route taken by said user-observer during a time period defined by the timestamps contained in the signaling datasets. The signaling dataset that is obtained is preferably stored in the data storage module 7. A signaling route relating to a user-observer may be considered to be part of a driving route relating to the same user-observer.

The timestamp of the time Tp when the malfunction is observed by the user-observer is preferably recorded in the form of date, hour, minute and second. The nature of said malfunction of the vehicle in question may be for example an out-of-service luminous signaling device, a deflated tire or an open fuel flap of said vehicle in question. The position Po of the vehicle of the user-observer is preferably expressed by GNSS coordinates.

Preferably, the user-observer performs this malfunction signaling step 220 preferably in real time as soon as he observes said malfunction affecting the vehicle in question, such that the notification system 1 is easily able, on the basis of the signaling dataset, to estimate the position Pp of the vehicle in question at the time Tp when the user-observer observes said malfunction.

In one advantageous embodiment, the signaling dataset comprises the identifier of the vehicle of the user-observer. The identifier of the vehicle is preferably a unique identifier UID comprising a unique character string used to identify the vehicle.

It should be noted that, at this stage, the vehicle in question is anonymous since, when the vehicle of the user-observer passes next to the vehicle in question, said user does not see the identifier of the vehicle in question. In addition, the driver of the vehicle in question, who is also one of the users of the signaling system 1, is not aware of the existence of the malfunction with his vehicle, probably due to the malfunction with the detection system of said vehicle in question. In other words, the driver of the vehicle in question is not able to perform the malfunction signaling step 220 in order to indicate the malfunction affecting his own vehicle in question.

An analysis step 230 of the notification method 200 is thus performed by the computing module 10. The analysis step 230 consists in identifying which vehicle is the vehicle in question, on the basis of the route datasets as well as the signaling datasets.

The route datasets, generated in step 210 by the users of the notification system 1, correspond to a plurality of driving routes each relating to one of the users. The signaling datasets, generated in step 220 by the user-observers who are also users of the notification system 1, correspond to a plurality of signaling routes each relating to one of the user-observers.

In one preferred embodiment, the analysis step 230 is performed by comparing the driving routes and the signaling routes, so as to determine whether, among the driving routes, there is a selected driving route that corresponds to signaling routes each lasting for a time period that is within the time period of the selected driving route. Advantageously, if a minimum percentage of a driving route, for example 60% of said driving route, corresponds to one or more signaling routes, said driving route is considered to be the selected driving route. In addition, as mentioned above, the user relating to the selected driving route is not aware of the malfunction affecting the vehicle in question, and is different from the user-observers relating to the signaling routes corresponding to said selected driving route.

As mentioned above, the time period of a driving route or of a signaling route is defined by the timestamps contained in route datasets corresponding to the driving route, or in signaling datasets corresponding to the signaling route. The correspondence between a selected driving route and a signaling route means that the signaling route is "similar" to a portion of the driving route for a time period defined by the timestamps of the signaling route.

The computing module 10 thus considers that the vehicle of the user that is taking the selected driving route is the vehicle in question. One simple example shown in FIG. 3 is used to explain the analysis step 230.

Figure 3:
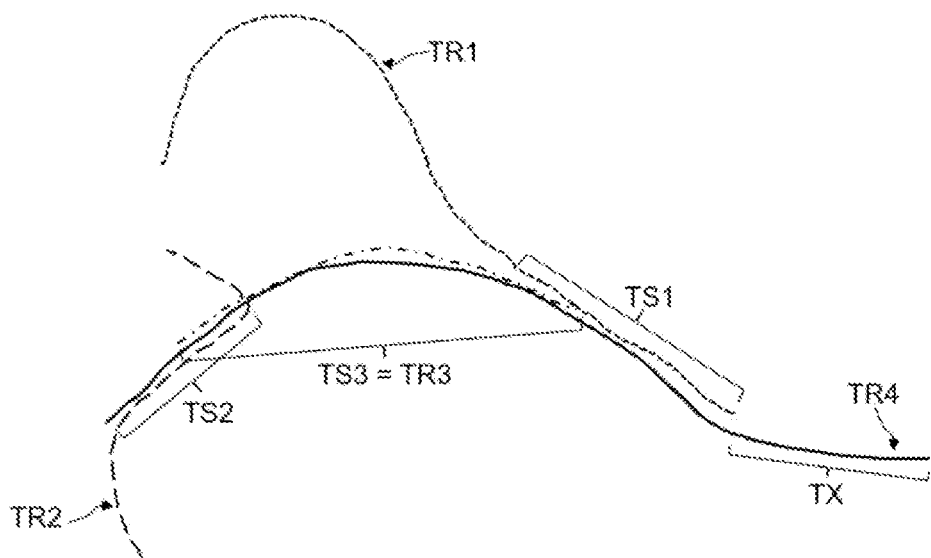
FIG. 3 illustrates one example used to explain the analysis step of the notification method according to an aspect of the invention.

FIG. 3 illustrates three signaling routes TS1 to TS3 and four driving routes TR1 to TR4. The first signaling route TS1 corresponds to first signaling datasets relating to a first user-observer. The first signaling route TS1 forms part of the first driving route TR1 relating to said first user-observer. Similarly, the second and third signaling routes TS2 and TS3 correspond, respectively, to signaling datasets relating to a second and to a third user-observer. The second signaling route TS2 forms part of the second driving route TR2 relating to said second user-observer. The third signaling route TS3 is the whole third driving route TR3 relating to said third user-observer.

The analysis step 230 consisting in comparing the driving routes and the signaling routes (including the three signaling routes TS1 to TS3) is performed. The comparison result indicates that the three signaling routes TS1 to TS3 are respectively similar to a portion of a driving route TR4. As illustrated in FIG. 3, the majority (for example greater than 60%) of the driving route TR4 effectively corresponds to the signaling routes TS1 to TS3 each lasting for a time period that is within the time period of the driving route TR4.

Thus, out of the driving routes obtained in step 210, the driving route TR4 is considered to be the selected driving route taken by the vehicle in question. The user relating to the selected driving route (that is to say driver of the vehicle in question) is different from the three user-observers relating to the signaling routes TS1 to TS3.

At the end of the analysis step 230, a notification step 240 of the notification method 200 is performed so as to generate a notification message intended to inform the driver of the vehicle in question (that is to say user relating to the selected driving route). The notification step 240 thus consists in generating a notification message and in sending it to the user.

The notification message comprises data used to indicate the time period and the position where the vehicle of the user relating to the selected driving route is liable to exhibit a malfunction. The notification message is generated by the computing module 10, on the basis of the following data: the route datasets relating to the selected driving route (for example "driving route TR4" from the above example), and the signaling datasets corresponding to the signaling routes (for example "signaling routes TS1 to TS3" from the above example) corresponding to the selected driving route.

The notification message may furthermore comprise data used to indicate to the user relating to the selected driving route the nature of the malfunction, in one preferred embodiment in which at least one of the signaling datasets corresponding to the selected driving route comprises data about said nature of the malfunction.

The generated notification message is then sent, via the transmission module 8, to the HMI interface 2 dedicated to the user relating to the selected driving route, such that the HMI interface 2 communicates the notification message to said user, preferably in real time. The notification message may be communicated vocally, textually or visually. Said user could thereby be prompted to check whether or not his vehicle, already having been identified as the vehicle in question, actually exhibits the malfunction observed by the user-observers.

The notification system 1 and the notification method 200 according to an aspect of the invention thus make it possible to signal to one of the users of the notification system 1 a malfunction liable to affect his vehicle during a driving phase, independently of the malfunction detection performed by an existing detection system integrated into the vehicle in question. Driving safety is therefore improved. In addition, this solution is implemented without any additional infrastructure cost and without any additional hardware equipment for users.

The invention claimed is:

1. A notification method implemented by a notification system, the method being configured so as to signal to a user a malfunction liable to affect the user's vehicle during a driving phase, said method comprising:

a monitoring step configured so as to generate route datasets relating to a driving route of a vehicle of each user of the notification system;

a malfunction signaling step configured so as to generate signaling datasets comprising information about another user's vehicle relating to a malfunction with said another user's vehicle as observed by a user-observer different from the user of the another user's vehicle;

an analysis step configured so as to identify which vehicle is the another user's vehicle, on the basis of the route datasets and the signaling datasets; and a notification step configured so as to generate a notification message intended for the user of the another user's vehicle, wherein:

the signaling datasets are used to estimate a signaling route taken by the user-observer, and the analysis step compares a plurality of driving routes respectively taken by a plurality of users with a plurality of signaling routes relating to a plurality of user-observers, so as to determine whether, among the driving routes, there is a selected driving route that corresponds to one or more signaling routes each lasting for a time period contained within the time period of the selected driving route; the vehicle of the user relating to the selected driving route being identified as the another user's vehicle.

2. The notification method as claimed in claim 1, wherein, if a minimum percentage of a driving route corresponds to one or more signaling routes, said driving route is considered to be the selected driving route.

3. The notification method as claimed in claim 1, wherein the notification message is generated on the basis of the following data: the route datasets relating to the selected driving route, and the signaling datasets corresponding to the signaling routes corresponding to the selected driving route.

4. The notification method as claimed in claim 1, wherein:

the route datasets each comprise the position of the vehicle of the user as observed at a first time, and the timestamp of said first time; and the signaling datasets each comprise the position of the vehicle of the user-observer as observed at a second time, and the timestamp of said second time.

5. The notification method as claimed in claim 1, wherein at least one of the signaling datasets comprises the nature of the malfunction and/or an identifier of the user-observer, the notification message comprising data used to indicate said nature of the malfunction to the another user's vehicle.

6. The notification method as claimed in claim 1, wherein, in the malfunction signaling step, the user-observer triggers the generation of the signaling dataset by pressing a predefined region of an HMI (denoted "Human-Machine Interface") interface dedicated to the user-observer.

7. A notification system configured so as to signal to a user a malfunction liable to affect his vehicle during a driving phase, comprising means configured so as to implement the notification method as claimed in claim 1; said means comprising a first HMI interface dedicated to the user relating to the vehicle that is identified as the another user's vehicle, the first HMI interface being configured so as to communicate, vocally, textually or visually, a notification message to said user relating to the another user's vehicle.

8. The notification system as claimed in claim 7, comprising a second HMI interface dedicated to the user-observer, who triggers the generation of a signaling dataset by pressing a predefined region of the second HMI interface.

9. The notification method as claimed in claim 2, wherein the notification message is generated on the basis of the following data: the route datasets relating to the selected driving route, and the signaling datasets corresponding to the signaling routes corresponding to the selected driving route.

* * * * *